United States Patent [19]

Graber

[11] Patent Number: 4,596,088
[45] Date of Patent: Jun. 24, 1986

[54] APPARATUS FOR INJECTING A LIQUID INTO THE VASCULAR PATHS OF A TREE

[75] Inventor: Alfred Graber, Fischbach-Goslikon, Switzerland

[73] Assignee: Birchmeier & Cie. AG, Kunten, Switzerland

[21] Appl. No.: 671,827

[22] Filed: Nov. 15, 1984

[30] Foreign Application Priority Data

Dec. 1, 1983 [CH] Switzerland ............... 6440/83

[51] Int. Cl.⁴ .................................. A01G 29/00
[52] U.S. Cl. ................................... 47/57.5
[58] Field of Search ......................... 47/57.5

[56] References Cited

U.S. PATENT DOCUMENTS

| | | | |
|---|---|---|---|
| 3,286,402 | 11/1966 | Newton | 47/57.5 |
| 3,461,588 | 8/1969 | Johnson | 47/57.5 X |
| 3,559,340 | 2/1971 | Good | 47/57.5 |
| 3,832,803 | 9/1974 | Blake et al. | 47/57.5 |
| 4,011,685 | 3/1977 | Boyd et al. | 47/57.5 |

FOREIGN PATENT DOCUMENTS 429370 1/1948 Italy ........................... 47/57.5

Primary Examiner—Robert E. Bagwill
Attorney, Agent, or Firm—Sughrue, Mion, Zinn, Macpeak and Seas

[57] ABSTRACT

A first piston 20 is cocked by applying pressure to a chamber 17 in the front end of a cylinder 10, which attendantly compresses a first spring 70. Upon subsequently releasing a trigger latch 82, the spring 70 drives an injection needle 31 carried by the rod 22 of the piston into a tree trunk. Pressure is next applied to a space 45 behind a second piston 40 slideable within the first piston skirt, which zero volumes a chamber 21 between the two pistons and compresses a second spring 71. The space 45 is then vented, whereupon the spring 71 separates the two piston heads to vacuum fill the reestablished chamber 21 with a vascular treatment liquid for trees. Finally, the space 45 is re-pressurized to force the liquid into the tree through the inserted needle.

7 Claims, 4 Drawing Figures

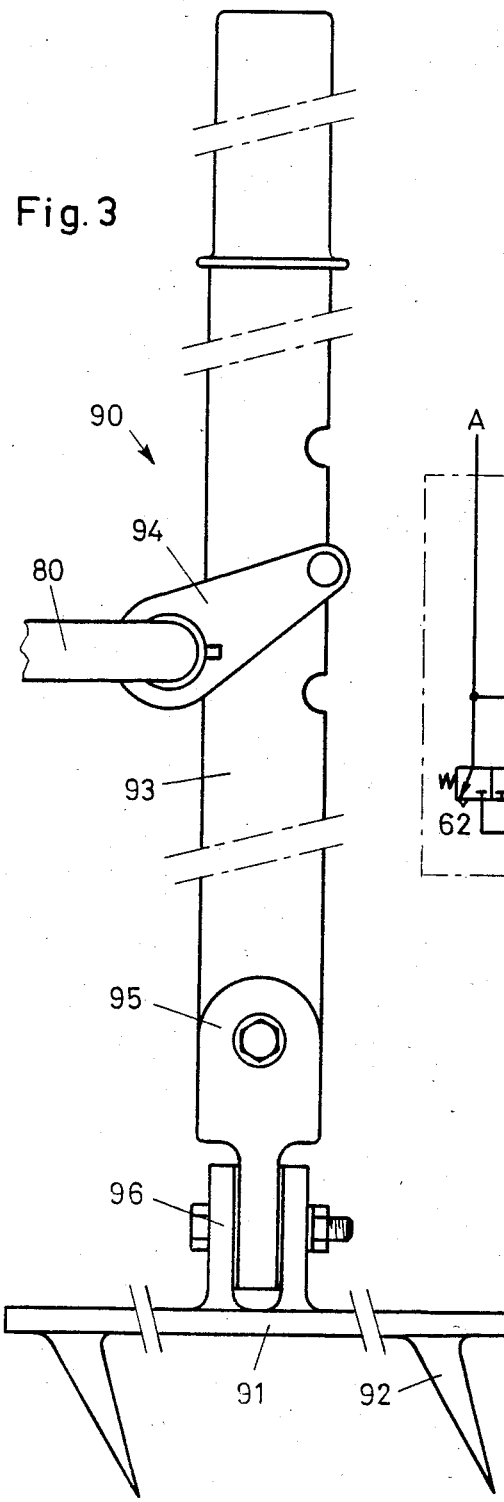
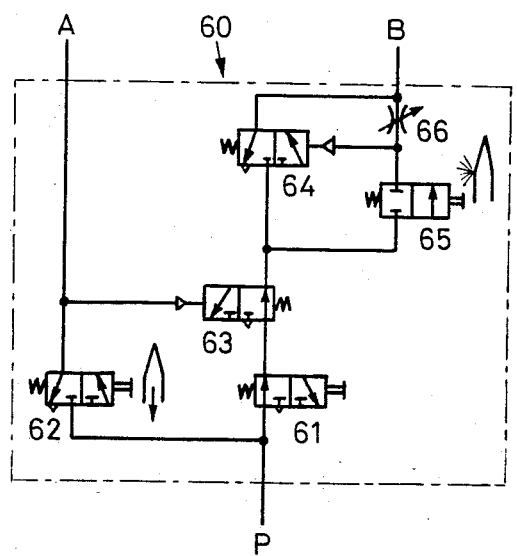
Fig. 3
Fig. 4

APPARATUS FOR INJECTING A LIQUID INTO THE VASCULAR PATHS OF A TREE

BACKGROUND OF THE INVENTION

This invention concerns an apparatus for injecting a liquid into the vascular paths of a lignified plant.

Through direct injection into the stem of plants, in particular trees, growth regulators and protective agents are directly conveyed to trees. An important area of application of this technique of injection is also the prevention of disease or the combating of insects, which nourish themselves on foliage or on wood grains. Insects can be combated just as are virus and fungus infections by means of this type of chemotherapy by the application of antibiotics and/or systematic conveyance of insecticides. It is known that the combating of various insect epidemics, such as the psendophilus testacens in Ghana in March 1978, was successful in this way. Also, the spread of diseases can be brought under control.

In practice, the applied liquids were conveyed to the plants by gravity through discharge pipes of a container. Such apparatuses are not intended for poisonous substances, however, because the containers cannot be tightly closed. Highly effective modern insecticides are poisonous to humans and must be kept in completely closed containers.

Insecticides with a phosphorous base are sufficiently effective that only quantities of 3 to 6 cm$^3$ must be conveyed. Such substances are, however, poisonous to such an extent that instructions for their handling must be strictly followed.

DE-C 12 77 618 proposes to form the container out of two feather-shaped parts with closing bottoms able to conversely slide into each other, with their surface shells tightly superimposed on each other, to thereby solve the problem of tight containers. The liquid then flows by gravity out of the container into the trunk of the tree.

Another solution involves a container in which an additional space for the production of a compressed gas is provided—see DE-C 12 40 325.

However, for the application of the medium, an injection needle must first be inserted into the trunk up to those depths in which the vascular parts of the plants are found. In DE-C 15 82 802 an impact apparatus is utilized to drive the injection needle into the trunk, in order to then be able to apply a container such as described above. Instead of driving an injection needle, DE-A 28 35 430 proposes to first drill holes in the trunk and then insert the nozzles into these holes.

In all of these known arrangements an injection needle or a nozzle is first inserted into the stem of the plant to be treated, and then the liquid in a desired quantity is introduced through the needle or the nozzle.

Up to now only one apparatus is known with which a liquid can be conveyed simultaneously with the formation of an access to the vascular parts—see U.S. Pat. No. 2,853,833. A cylindrical space with a valve is provided in an axe body, is opened through a strike with the axe by a tappet. A liquid is thereby conveyed, and departs through several canals near the cutting edge of the axe body. This is disadvantageous, however, because the plant is severely injured.

SUMMARY OF THE INVENTION

It is thus an object of this invention to provide an apparatus which can be pushed directly into the trunk to a predetermined depth without additional instruments for the insertion of the injection needle, and thereupon a desired quantity of a liquid can be driven in. Such apparatus includes a spring driven needle, and a fluid chamber which is expanded to draw in the treatment liquid and contracted to force it out through the needle and into the tree.

BRIEF DESCRIPTION OF THE DRAWINGS

FIG. 3 shows an anchor for mounting the apparatus of FIGS. 1 and 2, and

FIG. 4 is a diagram of a control device for applying the injection needle and for conveying liquid.

DETAILED DESCRIPTION OF THE PREFERRED EMBODIMENT

Figure 1:
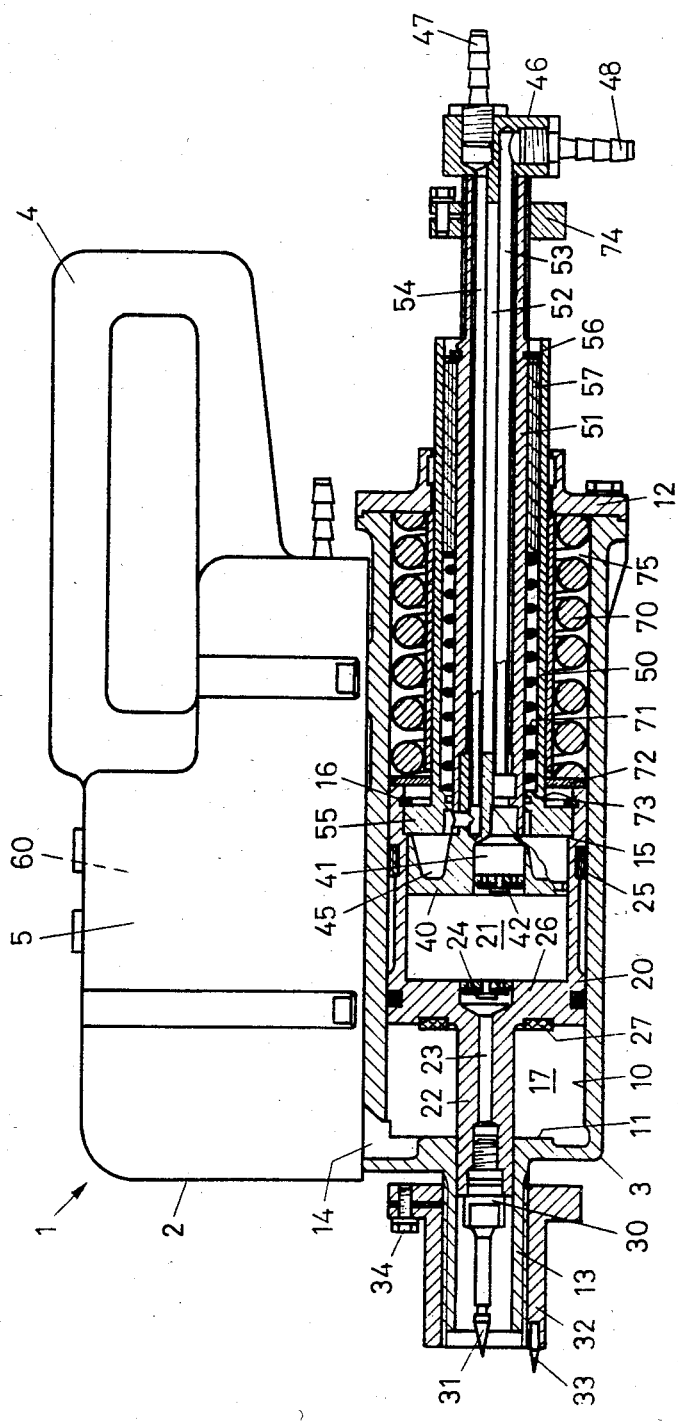
FIG. 1 is a part sectional view of an apparatus according to the invention.
Figure 2:
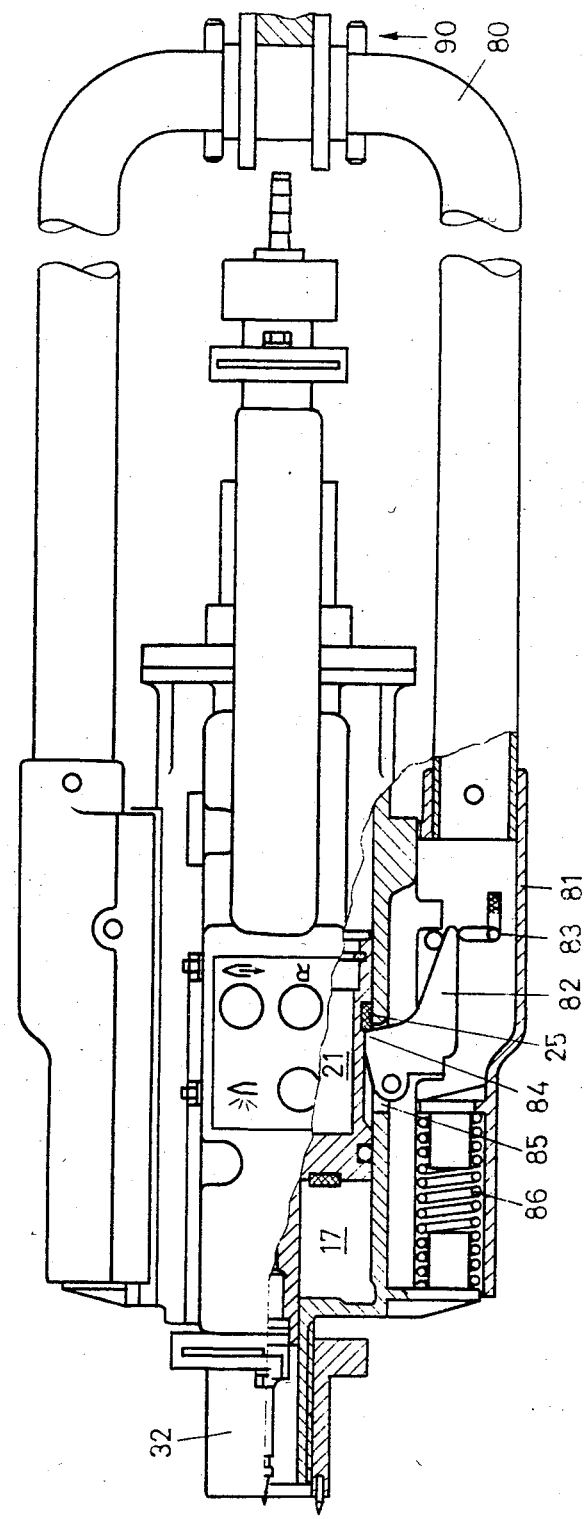
FIG. 2 is a top view of the apparatus, in part section, showing a device for releasing a piston in the apparatus.

The injection device in accordance with FIGS. 1 and 2 consists of a casing 1 with an upper part 2 and an under part 3. The upper part 2 mounts a carrying handle 4 and a rectangular compartment 5 for receiving a control apparatus 60 as shown in FIG. 4. The under part 3 houses all functional components.

The under part 3 has an inner cylindrical bore 10 closed on the left end by a base 11 on which a protective sheath 32 for the injection needle 31 is mounted by a screw 34. The base 11 is centrally equipped with a cylindrical connecting piece 13.

In cylinder bore 10 is found a first piston 20 which is fashioned with a central hollow space 21 open at one end. The piston base 26 is integral with an exterior piston rod 22, which extends into the connecting piece 13 of the base 11. The piston rod 22 has a central bore 23 which forms a conduit for liquid from the space 21 to the injection needle 31 attached to the piston rod. A non-return valve 24 in the bore 23 prevents the backflow of the ejected liquid.

The hollow space 21 is also cylindrically fashioned, and receives a second piston 40 connected to a tube-shaped piston rod 51 which centrally penetrates an end cover 12. A guide tube 50 surrounds the rod 51, and on the piston side carries a base flange 55 held in a recess 15 on the inside of the piston 20 by a snap ring 16.

A first spring 70 is disposed in the hollow space 75 between the guide tube 50 and the cylinder bore 10, and is supported at one end by the cover 12 and at the other end by a movable plate 72 bearing against the bottom of the first piston 20. A second spring 71 is disposed in the hollow space between the guide tube 50 and the rod 51 of the second piston 40. At one end this second spring is supported on a shoulder 73, and at the other end on an insert 57 held by a snap ring 56 on the piston rod 51.

A first conduit 54 for pressurized fluid in the hollow space of the piston rod 51 opens into the space 45 between second piston 40 and the base flange 55.

In a connection element 46 rigidly connected with the piston rod 51, are installed two flexible tube couplings 47, 48. The coupling 47 supplies fluid to the conduit 54.

A second conduit 53 in the piston rod 51 communicates through a passage 41 and non-return valve 42 in the second piston 40 between the other coupling 48 and the hollow space 21 in the first piston 20. The injection liquid is supplied through the coupling 48.

The control device 60, which is schematically shown in FIG. 4, has three connections A, B, and P. Connection A serves to convey pressurized fluid through the opening 14 in the cylinder base 11 to the space 17, and connection B conveys the fluid through the hose coupling 47 to the space 21.

The control device 60 includes four 3/2 distributing valves and one 2/2 distributing valve. Two 3/2 distributing valves 61, 62 are hand-operated, and two 3/2 distributing valves 63, 64 are activated by the pressurized fluid. The 2/2 distributing valve 65 is hand-operated. Accordingly, pressurized fluid from connection P can flow to connection A through manual valve 62 to retract the needle and cock the piston 20. By operating valve 65, valve 64 is opened and thereafter held open by the throttle 66 to close or "zero" the space 21 between the first and second pistons.

FIG. 2 shows a device for releasing the first piston 20. In an exterior area 81 of the lower casing part 3 is a firing lever 82 having a locking cam 84 which engages a locking shoulder 25 of the first piston 20 through a recess 85 in the cylinder wall 10. A safety catch or trigger 83 supports the tensioned firing lever 82 in a known manner.

In operation, when the valve 62 is operated pressurized fluid flows out of connection A through the opening 14 in the cylinder base 11 and into the space 17. The first piston 20 is thus driven to the right in FIG. 1 together with the guide tube 50, the second piston 40, and the piston rods 22 and 51 until the firing lever 82 snaps over the shoulder 25. The apparatus is now cocked, with the spring 70 compressed. If the firing lever 82 is now released the spring 70 snaps the first piston 20 together with its connected parts and in particular the needle 31 to the left, until the impact dampers 27 strike against the cylinder base 11. Assuming that the sheath 32 and its anchor spike 33 were previously applied against a tree trunk, the injection needle is consequently driven into the trunk.

By operating the valve 65 the second piston 40 is then driven to the left in FIG. 1 to close the space 21 and compress spring 71. Through subsequent operation of valve 61 the P-B connection is interrupted to vent space 45 and the spring 71 forces the second piston 40 to the right, whereby through the coupling 48 injection liquid is drawn in by vacuum and fills the opened space 21.

By again operating the valve 65, the second piston 40 is driven to the left in FIG. 1 and the fluid in the hollow space 21 is expelled into the tree trunk through the injection needle.

By means of an adjustable ring 74 clamped onto the piston rod 51, the movement of the rod can be limited so that if need be only a portion of the liquid is ejected from the hollow space 21.

To bring the impact of the released spring 70 with full effect onto the injection needle, a backing or reaction support is provided in accordance with FIG. 3. This support 90 has a base plate 91 with anchor spikes 92 and an anchor bar 93, which by means of two perpendicular pivot joints 95, 96 can be brought into any desired position, including a vertical one as shown. By means of an adjustably positioned gripper 94, a curved support bar 80 attached behind the casing 1 may be set to the correct working height.

As seen in FIG. 2, springs 86 disposed between the opposite exterior areas 81 and the lower casing part 3 enable a limited longitudinal displacement so that, if necessary, the length of the apparatus between a tree trunk and the support 90 may be shortened or compressed.

The injection needle 31 may have an elliptical cross-section which if aligned with the tree grain will make at the most a trivial wound as contrasted with the prior art boring or axe cut, which can in many cases be more damaging than the injection can be of use.

What is claimed is:

1. An apparatus for injecting a prescribed quantity of a liquid into a vascular path of a lignified plant, comprising:
   (a) a hollow cylinder (10) closed by a centrally apertured base (11) at one end and by a centrally apertured cover (12) at another, opposite end,
   (b) a first piston (20) slidably disposed in the cylinder and having a hollow skirt defining a liquid receiving first chamber (21) and a first hollow rod (22) extending from a head of the piston out through the base aperture and communicating with the chamber through a delivery passage in the head,
   (c) an injection needle (31) mounted on the outwardly extending end of the rod,
   (d) a second piston (40) slidably disposed within the skirt of the first piston and defining one end of the chamber, the movement of the second piston within the skirt of the first piston thus varying the volume of the chamber,
   (e) a supply passage (41) defined within the second piston for delivering liquid to the chamber, and
   (f) means (60, FIG. 4) for controlling the movement of both pistons to:
      (1) drive the tip of the needle into a vascular path of a lignified plant, and
      (2) pump liquid into the plant.

2. An apparatus according to claim 1, wherein:
   (a) a flanged (55) cylindrical sleeve (50) is rigidly mounted to the skirt of the first piston and extends out through the cylinder cover aperture, the sleeve flange and the second piston defining a second chamber (45) therebetween,
   (b) a second hollow rod (51) is integral with the second piston and extends out through the sleeve,
   (c) a first conduit (53) is provided within the second rod communicating with the supply passage of the second piston, and
   (d) a second conduit (54) is provided within the second rod communicating with the second chamber for supplying pressurized fluid thereto and for venting fluid therefrom, and further comprising:
   (e) a first helical spring (70) surrounding the sleeve and disposed between the skirt of the first piston and the cylinder cover for driving the first piston to insert the needle, and
   (f) a second helical spring (71) surrounding the second rod and disposed between the sleeve flange and the outwardly extending end of the second rod for decreasing the volume of the first chamber to pump the liquid.

3. An apparatus according to claim 2, wherein a pair of non-return valves (24, 42) are individually disposed in the delivery and supply passages of the first and second pistons.

4. An apparatus according to claim 3, wherein passage means (14) are provided in the cylinder proximate the base thereof for supplying pressurized fluid to a third chamber (17) defined between the first piston head and said base to compressively cock the first spring pursuant to driving the needle tip.

5. An apparatus according to claim 4, wherein the controlling means comprises a plurality of manually and spring controlled valves (61-65) for selectively pressurizing the second and third chambers.

6. An apparatus according to claim 5, wherein:

(a) a U-shaped support bar (80, 81) surrounds the cylinder and is spring mounted (86) to the apparatus proximate the cylinder base, and
(b) anchor means (90) are coupled to a rear portion of the support bar remote from the cylinder base for supporting and bracing the apparatus against a plant to be treated.

7. An apparatus according to claim 6, wherein trigger release means (82) are mounted in the support bar for engaging a shoulder (25) of the first piston to latch the cocked first spring.

* * * * *